United States Patent [19]

Hergenrother et al.

[11] Patent Number: 5,021,518

[45] Date of Patent: Jun. 4, 1991

[54] ETHYNYL TERMINATED IMIDOTHIOETHERS AND RESINS THEREFROM

[75] Inventors: Paul M. Hergenrother, Yorktown; John W. Connell, Newport News; R. Gerald Bass, Richmond, all of Va.

[73] Assignee: The United States of America as represented by the Adm inistration of the National Aeronautics and Space Administrations, Washington, D.C.

[21] Appl. No.: 347,558

[22] Filed: May 4, 1989

Related U.S. Application Data

[62] Division of Ser. No. 218,792, Jul. 14, 1988, Pat. No. 4,861,882.

[51] Int. Cl.$^5$ ............... C08F 283/04; C08F 283/00; C08G 73/10; C08G 16/00
[52] U.S. Cl. ........................... 525/422; 525/471
[58] Field of Search ............. 525/426, 534, 535, 536, 525/422, 471

[56] References Cited

U.S. PATENT DOCUMENTS 4,431,761  2/1984  Hergenrother ............... 525/534

Primary Examiner—John C. Bleutge
Assistant Examiner—Thomas Hamilton, III
Attorney, Agent, or Firm—George F. Helfrich

[57] ABSTRACT

Ethynyl terminated imidothioethers (ETIs) are prepared by the reaction of a dimercaptan, such as 4,4'-dimercaptodiphenyl ether, and an ethynyl containing maleimide, such as N-(3-ethynylphenyl)maleimide. Blends of these ETIs and ethynyl terminated polymeric materials, such as ethynyl terminated sulfones and ethynyl terminated arylene ethers, are also prepared. These resin blends exhibit excellent processability, and the cured blends show excellent fracture toughness and solvent resistance, as well as excellent adhesive and composite properties.

7 Claims, No Drawings

ETHYNYL TERMINATED IMIDOTHIOETHERS AND RESINS THEREFROM

ORIGIN OF THE INVENTION

The invention described herein was made jointly in the performance of work under a NASA Grant and an employee of the United States Government. In accordance with 35 USC 202, the grantee elected not to retain title.

This is a division of application Ser. No. 07/218,792, filed July 14, 1988, now U.S. Pat. No. 4,861,882.

BACKGROUND OF THE INVENTION

1. Field of the Invention

The present invention relates generally to imidothioethers. It relates particularly to ethynyl terminated imidothioethers prepared by the reaction of a dimercaptan and an ethynyl containing maleimide.

2. Description of Related Art

Linear polyimidothioethers, also referred to in the literature as polyimidosulfides, are commonly synthesized by the reaction of aromatic or aliphatic dimercaptans with aromatic or aliphatic bismaleimides. These polymers have a repeat unit of the following general type,

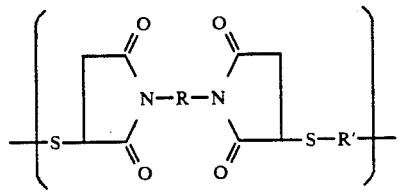

wherein R and R' are divalent aromatic or aliphatic radicals which may be 1,3-phenylene, 1,4-phenylene, 4,4'-oxydiphenylene, 1,2-ethane, 1,4-butane or any other appropriate divalent radical. The synthesis and characterization of linear polyimidothioethers were first described in 1972 (J. V. Crivello, *Polymer Preprints,* 13(2), 924 (1972)); see also J. V. Crivello, *J. Polymer Sci, Polymer Chem. Ed,* 14, 159 (1976); and J. V. Crivello, *Macromolecular Syntheses,* 6, 91 (1977). The polyimidothioethers were prepared in solution by the tertiary amine catalyzed Michael-type addition of aromatic or aliphatic dimercaptans to aromatic or aliphatic bismaleimides. Polyimidothioethers have also been prepared from the reaction of hydrogen sulfide with bismaleimides.

High molecular weight aromatic polyimidothioethers can form tough flexible films with good tensile properties and can be compression molded. They are generally soluble in N,N-dimethylformamide, N,N-dimethylacetamide, dimethylsulfoxide, N-methylpyrrolidone, hexafluoroacetone and m-cresol. Uncrosslinked polyimidothioethers are susceptible to solvent attack, especially in a stressed condition, and upon exposure undergo solvent induced stress crazing and cracking.

SUMMARY OF THE INVENTION

It is an object of the present invention to provide novel ethynyl terminated imidothioethers which are useful as adhesives, coatings, films, and composite matrices.

Another object of the present invention is to provide blends of these novel ethynyl terminated imidothioethers with other ethynyl terminated oligomers and polymers to produce resin blends which are useful as adhesives, coatings, films, membranes, and composite matrices.

According to the present invention, the foregoing and additional objects were obtained by synthesizing imidothioether compounds containing terminal ethynyl groups by reacting a dimercaptan and an ethynyl containing maleimide. The ethynyl terminated imidothioethers (ETI) exhibited lower melt temperatures (due to stereoisomers), higher fracture toughness and better adhesive properties than comparable bismaleimides. Cured blends of ETI and ethynyl terminated sulfone (ETS) oligomers and polymers, and cured blends of ETI and ethynyl terminated arylene ether (ETAE) oligomers and polymers afford excellent mechanical properties as films, moldings, adhesives, and composite matrices.

The ETI from the reaction of 4,4'-dimercaptodiphenyl ether and N-(3-ethynylphenyl)maleimide was prepared and blended in various proportions with ethynyl terminated sulfone oligomers with number average molecular weights ($\overline{M}n$) of 5360, 8890, and 12,000 g/mole. Blends of the same ETI with ethynyl terminated arylene ether oligomers prepared from 4,4'-dichlorobenzophenone and 9,9-bis(4-hydroxyphenyl)-fluorene having Mns of 4000 and 8000 g/mole were also prepared and evaluated. The various blends were readily processed and cured at 250° C. as thin films, moldings, adhesive specimens, and composites with a maximum cure temperature of 250° C.

DESCRIPTION OF THE PREFERRED EMBODIMENT

The general reaction sequence for the preparation of ethynyl terminated imidothioethers from a dimercaptan and an ethynyl containing maleimide is represented by the following equation:

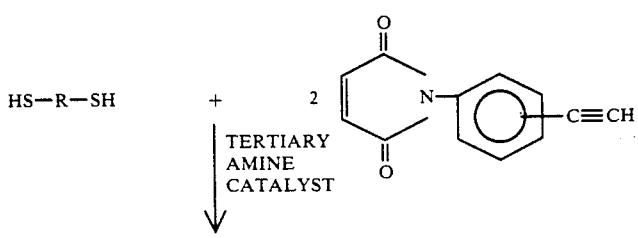

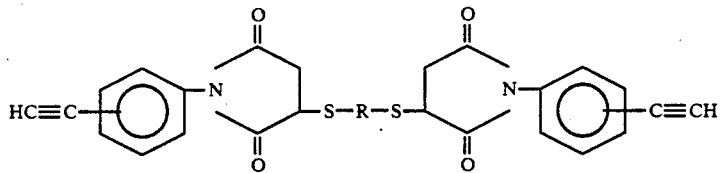

wherein R is selected from the group of divalent radicals consisting of $CH_2CH_2$, $CH_2CH_2CH_2$, $CH_2CH_2CH_2CH_2CH_2$, $CH_2OCH_2OCH_2$,

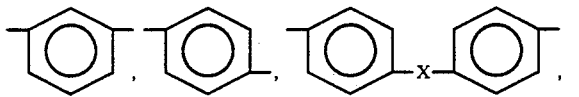

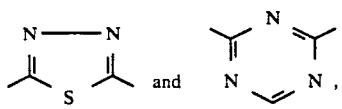

wherein X is a bond or is selected from the group consisting of $CH_2$, O, S, $C(CH_3)_2$, $C(CF_3)_2$, $SO_2$, and O=C. Any dimercapto terminated oligomers and mixtures thereof are also comprehended.

Any aromatic maleimide containing an ethynyl group, such as N-(3-ethynylphenyl)maleimide or N-(4-ethynylphenyl)maleimide, may be used. The solvent may be 1,4-dioxane, chloroform, m-cresol, N,N-dimethylacetamide, or dimethyl sulfoxide containing a catalytic amount of a tertiary amine such as triethylamine or tributylamine.

Blends of the ETI and ethynyl terminated sulfones (ETS) and ethynyl terminated arylene ethers (ETAE) were prepared by dissolving various amounts of each component in a suitable solvent such as chloroform, methylene chloride, or 1,4-dioxane, mixing, and removing the solvent. Ethynyl terminated sulfone oligomers and polymers are those described in U.S. Pat. No. 4,431,761. These materials have the following general structure:

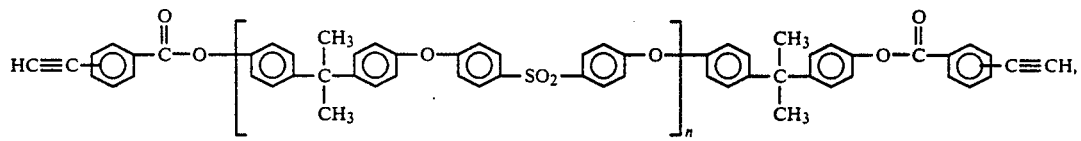

wherein n is an integer representing 3 to 59 repeat units. The ethynyl terminated arylene ether oligomers and polymers are prepared according to a procedure similar to that disclosed in U.S. Pat. No. 4,431,761. These materials have the following general structure:

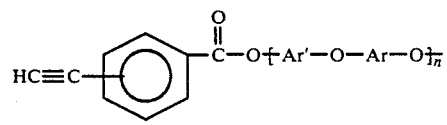

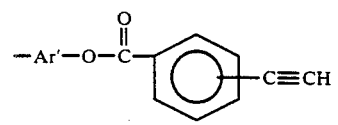

wherein n is an integer representing 3 to 60 repeat units. Linkage of the phenylethynyl groups may be either meta or para. Ar is a divalent aromatic radical selected from the group consisting of:

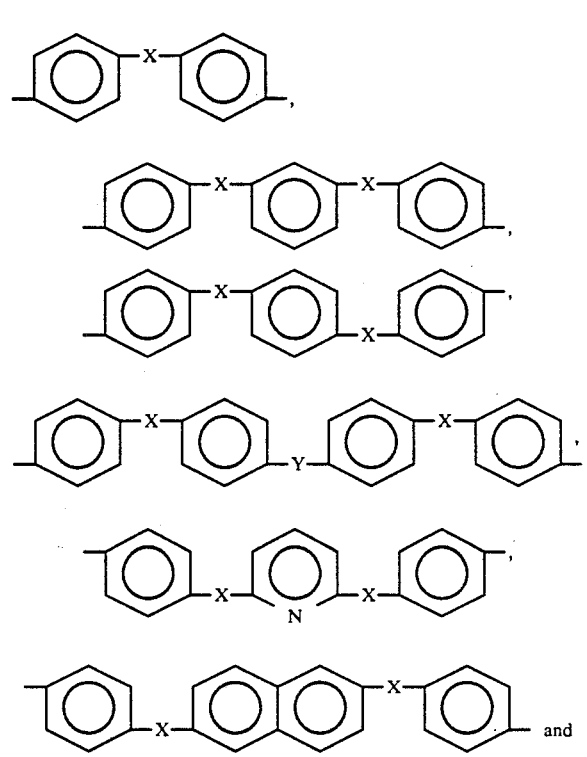

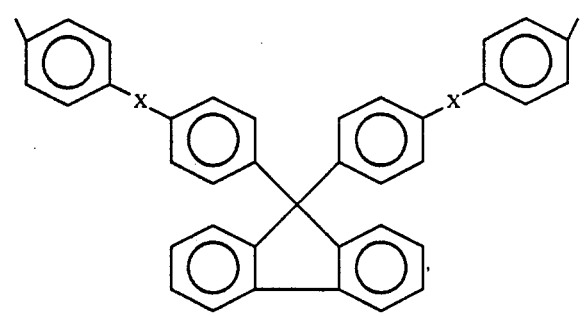

wherein X is selected from the group consisting of O=C and $SO_2$, and y is a bond, or is selected from the group O, S, $CH_2$, O=C, $SO_2$, $C(CH_3)_2$, and $C(CF_3)_2$. Ar' is a divalent aromatic radical selected from the group consisting of:

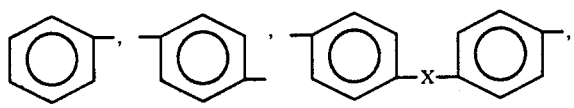

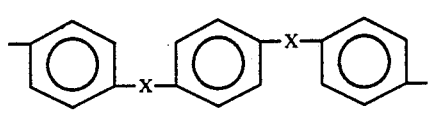

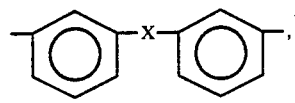

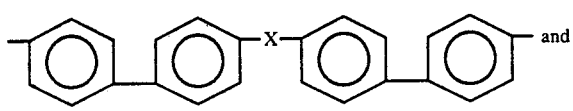 and

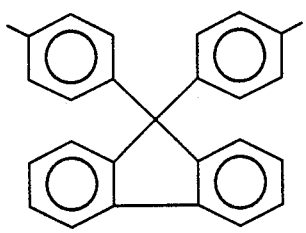

wherein X is a bond or is selected from the group CH$_2$, O, S, O=C, SO$_2$, C(CH$_3$)$_2$, and C(CF$_3$)$_2$.

Beneficial results are also obtained if an ETI according to the present invention is blended with any ethynyl terminated or pendant ethynyl containing oligomers or polymers, such as ethynyl terminated imide oligomers and polymers, ethynyl terminated ester oligomers and polymers, and phenylquinoxaline oligomers and polymers containing pendant ethynyl groups.

The ETI from the reaction of 4,4'-dimercaptodiphenyl ether and N-(3-ethynylphenyl)maleimide was prepared and blended in various proportions with ethynyl terminated sulfone oligomers with number average molecular weights ($\overline{M}n$) of 5360, 8890, and 12,000 g/mole. Blends of the same ETI with ethynyl terminated arylene ether oligomers prepared from 4,4'-dichlorobenzophenone and 9,9-bis(4-hydroxyphenyl)-fluorene having $\overline{M}$ns of 4000 and 8000 g/mole were also prepared and evaluated. The various blends were readily processed and cured at 250° C. as thin films, moldings, adhesive specimens, and composites with a maximum cure temperature of 250° C. As is seen in Table 1 below, the glass transition temperatures (Tg) of the cured blends ranged from 193° to 245° C. as measured by differential scanning calorimetry (DSC), and thermogravimetric analysis (TGA) of the blends generally showed a 10% weight loss occurring near 380° C. in air and 350°–400° C. in nitrogen. Isothermogravimetric analysis of blends 1:1 ETI/ETS (5360 g/mol) and 1:1 ETI/ETS (8890 g/mole) in flowing air showed a 10% weight loss occurring after 210 hours at 232° C.

TABLE 1

PHYSICAL CHARACTERIZATION

| MATERIAL (G/MOLE) | GLASS TRANSITION TEMPERATURE, °C. DSC[1] | TGA[2], °C. AIR | TGA[2], °C. NITROGEN |
|---|---|---|---|
| ETI | ND | 375 | 375 |
| ETS (5360) | 202 | — | 475 |
| ETS (8890) | 200 | — | 475 |
| ETS (12,000) | 196 | — | 485 |
| 1:1 ETI/ETS (5360) | 207 | 365 | 350 |
| 1:1 ETI/ETS (8890) | 198 | 365 | 350 |
| 1:1 ETI/ETS (12,000) | 197 | 380 | 385 |
| 1:1 ETI/UDEL ® P1700 | 193 | — | — |
| 2:1 ETI/ETS (5360) | ND | 375 | 380 |
| 1:2 ETI/ETS (5360) | 200 | 405 | 400 |
| 1:1 ETI/ETAE (4000) | ND | 405 | 410 |
| 1:1 ETI/ETAE (8000) | 245 | 410 | 415 |

[1]HEATING RATE 20° C./MIN, AFTER HEATING TO 300° C.
[2]HEATING RATE 2.5° C./MIN, FLOW RATE 15 CC/MIN, POWDER SAMPLE, TEMPERATURE OF 10% WEIGHT LOSS
ND, NOT DETECTED

The powdered blends were melt pressed into thin films and subsequently tested for solvent resistance while under stress in chloroform and hydraulic fluid. All of the films tested showed excellent resistance to hydraulic fluid after 24 hours immersion. After a one hour immersion in chloroform, the ETIs and the blends with high cross-link density exhibited very slight swelling, whereas the blends with low crosslink density exhibited more pronounced swelling (see Table 2 below). Moldings of the blends were prepared by heating powder in a stainless steel mold to 160°–190° C. for one hour then to 250° C. for one-half hour under 50 to 200 psi. The moldings were subsequently machined into compact tension specimens and tested for fracture toughness (K$_{Ic}$, stress intensity factor). The fracture toughness of the blends ranged from 600 to 1700 in ½ depending upon cross-link density. See following Table 2.

TABLE 2

MATERIAL CHARACTERIZATION

| MATERIAL (G/MOLE) | K$_{Ic}$[1], PSI In½ | CHCL$_3$ RESISTANCE[2] |
|---|---|---|
| ETS | <600 | Excellent |
| ETS (5360) | 1265 | Good |
| ETS (8890) | 1685 | Fair |
| ETS (12,000) | 2065 | Poor |
| 1:1 ETI/ETS (5360) | 950 | Good |
| 1:1 ETI/ETS (8890) | 1400 | Fair |
| 1:1 ETI/ETS (12,000) | 1720 | Poor |
| 1:1 ETI/UDEL ® P1700 | 1500 | Poor |
| 2:1 ETI/ETS (5360) | 1500 | Fair |
| 1:2 ETI/ETS (5360) | 615 | Excellent |
| 1:1 ETI/ETAE (4000) | 850 | Good |
| 1:1 ETI/ETAE (8000) | 1475 | Fair |

[1]Critical stress intensity factor according to ASTM E399, Average of Four Specimens per Test
[2]One Hour Immersion Under Stress Titanium to titanium tensile shear specimens of the blends were fabricated under the conditions set forth in Table 3 and subsequently tested with the strengths reported in Table 3. The tested specimens exhibited predominantly cohesive failure.

TABLE 3

TENSILE SHEAR STRENGTHS[1]

| MATERIAL (G/MOLE) | TEST TEMPERATURE, °C. | Ti/Ti TENSILE SHEAR STRENGTH, PSI |
|---|---|---|
| 1:1 ETI/ETS (5360)[2] | 23 | 3500 |

TABLE 3-continued

TENSILE SHEAR STRENGTHS[1]

| MATERIAL (G/MOLE) | TEST TEMPERATURE, °C. | Ti/Ti TENSILE SHEAR STRENGTH, PSI |
| --- | --- | --- |
| | 177 | 2500 |
| 1:1 ETI/ETS (8890)[2] | 23 | 4500 |
| | 150 | 2500 |
| | 177 | TP[4] |
| 1:1 ETI/ETAE (8000)[3] | 23 | 4600 |
| | 100 | 3575 |
| | 150 | 1800 |

[1]112 E-Glass, A-1100 Finish, ASTM D1008, Four Specimens per Test
[2]Bonding Conditions: RT → 160° C., 50 psi, 0.5 hour → 250° C., 50 psi, 0.5 hour
[3]Bonding Conditions: RT → 190° C., 200 psi, 0.5 hour → 250° C., 200 psi, 0.5 hour
[4]TP = Thermoplastic Carbon/graphite fiber was coated with a 40% solution of 1:1 ETI/ETAE (8000 g/mole), (from the reaction of 4,4'-dichlorobenzophenone and 9.9-bis-(4-hydroxyphenyl)fluorene) in 1,4-dioxane on a drum winding machine and dried. The prepreg was stacked and cured in a stainless steel mold by holding at 190° C. for one hour under 200 psi, and at 250° C. for one-half hour under 200 psi, to give a unidirectional composite with a calculated resin content of approximately 38%. Mechanical properties are reported in Table 4.

TABLE 4

UNIDIRECTIONAL LAMINATE PROPERTIES OF CURED BLEND OF 1:1 ETI/ETAI (8000 g/mol)*

| TEST TEMP., °C. | FLEXURAL STRENGTH, KSI | FLEXURAL MODULUS, MSI | SHORT BEAM SHEAR STRENGTH, KSI |
| --- | --- | --- | --- |
| 23 | 246.0 | 16.8 | 10.8 |
| 121 | 189.5 | 16.8 | 5.1 |
| 150 | 109.8 | 9.2 | 4.2 |
| 23 (500 HR AT 177° C.) | 180.8 | 16.2 | 5.8 |
| 150 (500 HR AT 177° C.) | 162.7 | 14.0 | 4.9 |
| 23 (1000 HR AT 177° C.) | 200.0 | 15.1 | 5.9 |
| 121 (1000 HR AT 177° C.) | — | — | 5.4 |
| 150 (1000 HR AT 177° C.) | 156.5 | 14.0 | 5.2 |
| 177 (1000 HR AT 177° C.) | — | — | 4.6 |
| 23 (500 HR AT 200° C.) | 233.5 | 13.6 | — |
| 150 (500 HR AT 200° C.) | 170.0 | 13.0 | — |
| 23 (1000 HR AT 200° C.) | 221.9 | 13.5 | — |
| 150 (1000 HR AT 200° C.) | 190.1 | 13.0 | — |

*UNSIZED AS-4 CARBON FIBER; PROCESSING CONDITIONS: 190° C., 200 PSI, 0.5 HR, THEN 250° C., 0.5 HR. CALCULATED RESIN CONTENT 38%.

EXAMPLE I

Synthesis of an ETI by the reaction of 4,4,'-dimercaptodiphenyl ether and N-(3-ethynylphenyl)maleimide.

A solution of N-(3-ethynylphenyl)maleimide (63.1 g, 0.32 mol) in 1,4-dioxane (750 ml) was added dropwise to a solution of 4,4'-dimercaptodiphenyl ether (37.5 g, 0.16 mol) in 1,4-dioxane (200 ml) containing triethylamine (1 ml). The addition was complete after two hours, and the solution was stirred at room temperature overnight. The product was isolated by precipitation in water containing a small amount of hydrochloric acid, dried at 100° C., and pulverized to give 99.5 g (99%) of pale yellow powder, a mixture of d, l and meso stereoismers, m.p. 59°–72° C. Anal. calcd. for $C_{36}H_{24}O_5S_2N_2$: C, 68.77%; H, 3.85%: N, 4.45%. Found: C, 68.53% H, 3.86%; N, 4.39%. The differential scanning calorimetric curve of this compound exhibited a broad melting endotherm peaking at 72° C. and an exothermic peak due to the reaction of the ethynyl groups at 220° C. Thermogravimetric analysis of this material after curing at 250° C. for one-half hour exhibited a 10% weight loss at 375° C. in both air and nitrogen.

EXAMPLE II

Preparation of a 1:1 blend of the ETI and an ethynyl terminated sulfone (ETS) oligomer with Mn of 8890 g/mole.

The ETI (25.0 g) and the ETS (8890 g/mole) (25.0 g) were dissolved in methylene chloride (200 ml). The solution was stirred for approximately one hour and the solvent removed by evaporation. The residue was dried at 50°–75° C. for several hours, and the solid was subsequently pulverized to give a fine powder. A thin film (approximately 5 mils) was melt pressed by heating the powder to 250° C. and holding for one-half hour. The film was subsequently tested for solvent resistance under stress in chloroform for one hour and hydraulic fluid for 24 hours. The sample was unaffected by hydraulic fluid. However the film swelled by about 15% after immersion in chloroform. A molding was prepared by heating to 160° C. for one hour then 250° C. for one-half hour each under 50 psi. A fracture toughness value of 1400 psi in$^{\frac{1}{2}}$, ($K_{Ic}$, stress intensity factor) was obtained for this cured blend. Solutions of this blend in 1,4-dioxane were used to prepare adhesive tape using 112 E-glass with an A-1100 finish. Titanium tensile shear specimens were subsequently fabricated by heating to 250° C for one-half hour under 100 psi. Tensile shear strengths at 23 and 150, of 4500 and 2500 psi, respectively, were obtained with thermoplastic failure at 177° C. By DSC this blend after heating to 300° C. showed a Tg of 198° C. By TGA this material exhibited a 10% weight loss at about 360° C. in air and nitrogen. Isothermogravimetric analysis in flowing air showed a 10% weight loss after 210 hours at 232° C.

EXAMPLE III

Preparation of a 1:1 blend of the ETI and an ethynyl terminated arylene ether (ETAE) oligomer (prepared from 4,4'-dichlorobenzophenone and 9,9'-bis(4-hydroxyphenyl)fluorene) with Mn of 8000 g/mole.

The ETI (87.5 g) and the ETAE (8000 g/mole) (87.5 g) were dissolved in methylene chloride (1000 ml). After removal of solvent by evaporation and drying, the solid residue was pulverized. A thin film of this material after curing at 250° C. for one-half hour was unaffected by hydraulic fluid. However after immersion in chloroform for one hour the film swelled by about 15%. A molding prepared by heating to 190° C. for one hour, then 250° C. for one-half hour under 100 psi gave a fracture toughness value of 1475 psi in$^{\frac{1}{2}}$ ($K_{Ic}$, stress intensity factor). Solutions of this blend in 1,4-dioxane were used to prepare adhesive tape and then used to prepare titanium adhesive specimens which gave tensile shear strengths at 23°, 100° and 150° C. of 4600, 3575 and 1800 psi, respectively. Unidirectional prepreg was prepared by solution coating graphite fiber on a drum winding machine. The prepreg was stacked and processed by heating to 190° C. for one hour under 200 psi, then heating to 250° C. for one-half hour under 200 psi, to give a unidirectional composite with a calculated resin content of 38%. The composite gave room temperature flexural strength and flexural modulus of 246,000 and 16,750,000 psi, respectively (see Table 4 above). By DSC this blend after heating to 300° C. exhibited a glass transition temperature of 245° C. TGA indicated a 10% weight loss occurring at 410° C. in air and nitrogen.

The present invention has been described above in detail with respect to certain preferred embodiments thereof. However, as understood by those of skill in the art, variations and modifications in this detail may be made without any departure from the spirit and scope of the present invention, as defined in the hereto-appended claims.

What is claimed is:

1. A resin blend comprising an ethynyl terminated polymeric material selected from the group consisting of ethynyl terminated sulfones and ethynyl terminated arylene ethers in combination with:

an ethynyl terminated imidothioether having the following structural formula:

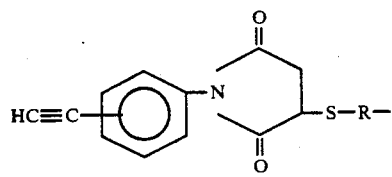

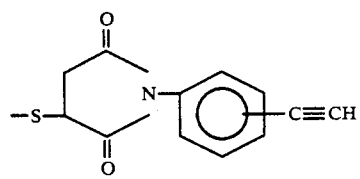

wherein R is selected from the group of divalent radicals consisting of CH$_2$CH$_2$, CH$_2$CH$_2$CH$_2$, CH$_2$CH$_2$CH$_2$CH$_2$CH$_2$, CH$_2$OCH$_2$OCH$_2$,

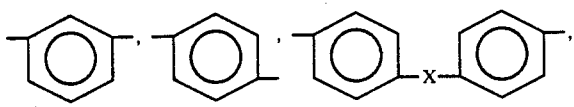

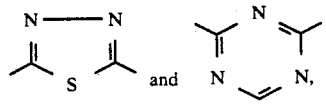

wherein X is a bond or is a member selected from the group consisting of CH$_2$, O, S, C(CH$_3$)$_2$, C(CF$_3$)$_2$, SO$_2$, and O=C, and wherein the ethynyl terminated imidothioether is formed as a mixture of stereoisomers and comprises the d, l, and meso forms.

2. The resin blend of claim 1, wherein the ethynyl terminated sulfone has the following general structure:

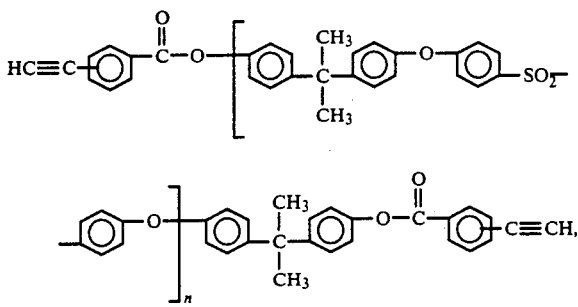

wherein n is an integer representing 3 to 59 repeat units.

3. The resin blend of claim 2, wherein the ethynyl terminated sulfone has a number average molecular weight of between about 5,000 and 12,000 g/mole.

4. The resin blend of claim 3 which has been cured.

5. The resin blend of claim 1, wherein the ethynyl terminated arylene ether has the following general structure:

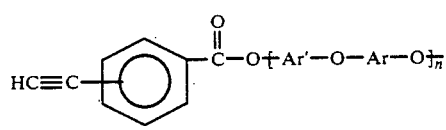

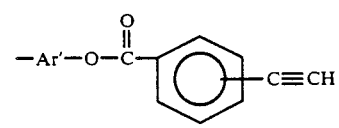

wherein n is an integer representing 3 to 60 repeat units and Ar is a divalent aromatic radical selected from the group consisting of:

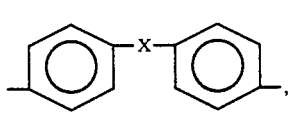

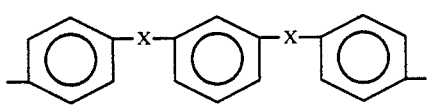

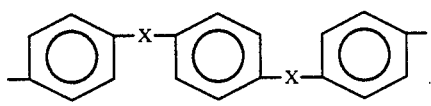

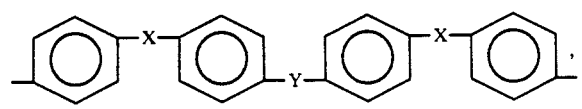

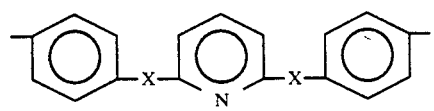

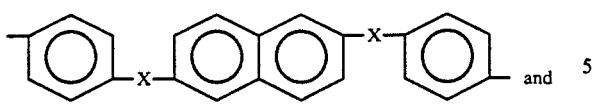 and

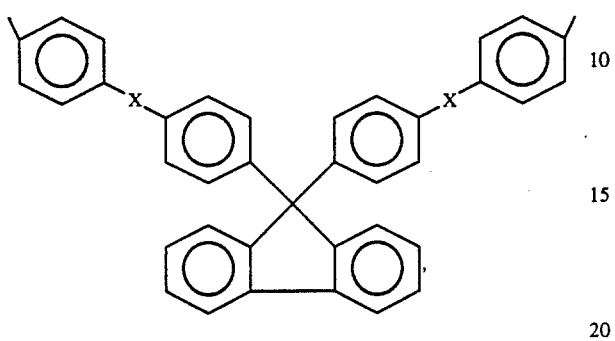

wherein X is selected from the group consisting of O=C and SO$_2$, and y is a bond or is selected from the group consisting of O, S, CH$_2$, O=C, SO$_2$, C(CH$_3$)$_2$, and C(CH$_3$)$_2$, and wherein Ar is a divalent aromatic radical selected from the group consisting of:

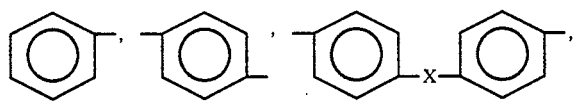

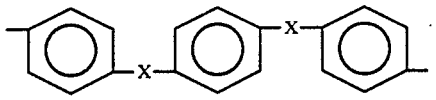

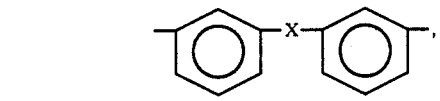

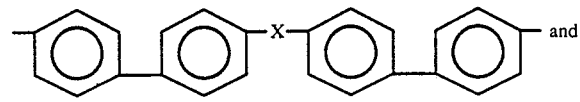 and

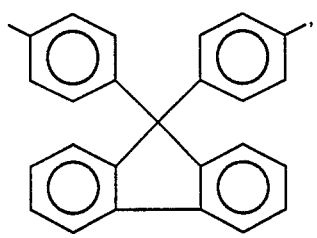

wherein X is a bond or is selected from the group consisting of CH$_2$O, S, O=C, SO$_2$, C(CH$_3$)$_2$, and C(CF$_3$)$_2$.

6. The resin blend of claim 5, wherein the ethynyl terminated arylene ether is an oligomer prepared from 4,4'-dichlorobenzophenone and 9,9'-bis(4-hydroxyphenyl)-fluorene.

7. The resin blend of claim 6 which has been cured.

* * * * *